United States Patent
Brogan et al.

(10) Patent No.: US 9,963,020 B2
(45) Date of Patent: May 8, 2018

(54) DOOR HINGE AND DOOR HINGE SYSTEM FOR VEHICLE

(71) Applicant: Faraday&Future Inc., Gardena, CA (US)

(72) Inventors: Cian John Francis Brogan, Franklin, MI (US); Ryan Benjamin Wonfor, Gardena, CA (US); Matthew Richard Partsch, Rancho Palos Verdes, CA (US); Padmanabhan Kumar, Rancho Palos Verdes, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 65 days.

(21) Appl. No.: 15/056,873

(22) Filed: Feb. 29, 2016

(65) Prior Publication Data

US 2017/0246937 A1    Aug. 31, 2017

(51) Int. Cl.
| | |
|---|---|
| *B60J 5/04* | (2006.01) |
| *E05F 15/616* | (2015.01) |
| *E05F 15/70* | (2015.01) |
| *E05D 15/00* | (2006.01) |
| *E06B 3/34* | (2006.01) |

(52) U.S. Cl.
CPC ............ *B60J 5/0468* (2013.01); *B60J 5/047* (2013.01); *E05D 15/00* (2013.01); *E05F 15/616* (2015.01); *E05F 15/70* (2015.01); *E06B 3/34* (2013.01)

(58) Field of Classification Search
CPC ......... E05F 15/63; E05F 15/622; E05F 15/70; E05F 15/73; E05F 1/1091; E05F 15/43; E05F 15/603; E05F 15/627; B60J 5/101; B60J 10/86; B60J 5/0473; B60J 5/06; B60J 10/40; B60J 5/0479; B60J 5/125; B60J 1/1853
USPC ...... 296/146.4, 146.8, 155, 190.11, 61, 1.01, 296/24.38, 50
See application file for complete search history.

(56) References Cited

U.S. PATENT DOCUMENTS

| | | | |
|---|---|---|---|
| 7,739,836 B2 | 6/2010 | Keane et al. | |
| 7,959,211 B2* | 6/2011 | Jimenez | E05F 15/42 |
| | | | 296/146.4 |
| 8,366,175 B2* | 2/2013 | Schmitt | E05C 17/006 |
| | | | 16/86 B |
| 8,373,550 B2* | 2/2013 | McKee | H02P 29/028 |
| | | | 296/146.4 |
| 8,414,062 B2* | 4/2013 | Gobart | E05D 11/1028 |
| | | | 16/82 |

(Continued)

OTHER PUBLICATIONS

International Search Report for International Application No. PCT/US2017/020035 dated Jun. 23, 2017.

*Primary Examiner* — D Glenn Dayoan
*Assistant Examiner* — Sunsurraye Westbrook
(74) *Attorney, Agent, or Firm* — Finnegan, Henderson, Farabow, Garrett & Dunner, LLP (57) ABSTRACT

A vehicle door hinge system may include an actuator configured to pivot a vehicle door and a door hinge. The actuator may include a door strut. The door hinge may include a body strap, a door strap, and a strut strap having a strap end and a strut end. The strap end may be attached to the body strap, and the strut end of the strut strap and the door strut may be pivotally coupled to one another, such that the door of the vehicle is opened when the door strut is extended and closed when the door strut is retracted.

20 Claims, 7 Drawing Sheets

(56) References Cited

U.S. PATENT DOCUMENTS

| | | | | |
|---|---|---|---|---|
| 8,733,022 B2* | 5/2014 | Sonnek | ............... | E05B 81/00 |
| | | | | 296/146.4 |
| 8,777,295 B2* | 7/2014 | Charnesky | ............ | B60J 5/0477 |
| | | | | 296/146.4 |
| 2007/0062366 A1 | 3/2007 | Lautenschlager et al. | | |
| 2007/0234520 A1 | 10/2007 | Faubert et al. | | |
| 2007/0245525 A1* | 10/2007 | Hoffman | ............... | B60J 5/0472 |
| | | | | 16/367 |
| 2009/0000059 A1* | 1/2009 | Nakaura | ............... | E05F 15/48 |
| | | | | 16/82 |
| 2009/0072580 A1* | 3/2009 | Wojtach, Jr. | ............ | E05F 15/53 |
| | | | | 296/146.4 |
| 2013/0088021 A1 | 4/2013 | Krajenke et al. | | |
| 2015/0059250 A1 | 3/2015 | Miu et al. | | |

\* cited by examiner

DOOR HINGE AND DOOR HINGE SYSTEM FOR VEHICLE

FIELD

The present disclosure relates to a door hinge and door hinge system, and more particularly, to a door hinge and door hinge system for a vehicle.

BACKGROUND

A conventional door of a vehicle is typically pivotally coupled to a body of the vehicle via one or more conventional door hinges. Additionally, to dampen the pivoting movement of the door (e.g., to prevent the door from opening or closing too quickly), a strut resisting movement of the door may be provided. One end of the strut may be pivotally coupled to the door and the other end of the strut may be pivotally coupled to the body of the vehicle. The strut may also assist with manually closing and opening the door by reducing the amount of force needed to close or open the door (e.g., when opening the door on a hill or when the door is configured to lift up to open against the gravity). In some conventional doors, the strut may act as an infinite check, providing a constant resistance throughout the opening of the door. However, the presence of the strut between the door and the body of the vehicle may cause the body of the vehicle to deflect as the door is opened or closed. In some situations, the deflection may negatively affect the reliability of the door as well as the smoothness of the closing and opening motion of the door. Alternatively, some conventional doors may include a check strap that may limit the stroke of the door to prevent the door from opening too far. The check strap may also include pre-set detents that allow the door to be opened to pre-set positions and to maintain those positions.

SUMMARY

According to one aspect, a vehicle door hinge system may include an actuator configured to pivot a vehicle door. The actuator may include a door strut. The door hinge system may also include a door hinge. The door hinge may include a body strap having a body end and a pivot end, the body end of the body strap being configured to be coupled to a body of a vehicle. The door hinge may also include a door strap having a door end and a pivot end, the door end of the door strap being configured to be coupled to a door of the vehicle, wherein the pivot end of the door strap and the pivot end of the body strap are pivotally coupled to one another to form a first pivot. The door hinge may further include a strut strap having a strap end and a strut end, the strap end being attached to the body strap between the body end and the pivot end of the body strap, and the strut end of the strut strap and the door strut being pivotally coupled to one another to form a second pivot. Respective pivot axes of the first and second pivots may be parallel to one another and separated by an offset distance, such that the door of the vehicle is opened when the door strut is extended and closed when the door strut is retracted.

According to another aspect, a vehicle may include a vehicle body, a door coupled to the vehicle body, and an actuator configured to assist with opening and closing the door. The vehicle may also include a door strut having a first end and a second end, and a door hinge coupling the door to the vehicle body. The door hinge may include a body strap having a body end and a pivot end, the body end of the body strap being coupled to the vehicle body. The door hinge may also include a door strap having a door end and a pivot end, the door end of the door strap being coupled to the door, wherein the pivot end of the door strap and the pivot end of the body strap are pivotally coupled to one another to form a first pivot. The door hinge may further include a strut strap having a strap end and a strut end, the strap end being coupled to the body strap between the body end and the pivot end of the body strap, and the strut end of the strut strap and the first end of the door strut being pivotally coupled to one another to form a second pivot. Respective pivot axes of the first and second pivots may be parallel to one another and separated by an offset distance, such that the door of the vehicle is opened when the door strut is extended and closed when the door strut is retracted.

According to a further aspect, a vehicle door hinge system may include an actuator configured to pivot a vehicle door. The actuator may include the door strut. The door hinge system may also include a door hinge. The door hinge may include a body strap having a body end, a pivot end, and a strut end, the body end of the body strap being configured to be coupled to a body of a vehicle and the strut end of the body strap and a door strut being pivotally coupled to one another to form a first pivot. The door hinge may also include a door strap having a door end and a pivot end, the door end of the door strap being configured to be coupled to a door of the vehicle. The pivot end of the door strap and the pivot end of the body strap may be pivotally coupled to one another to form a second pivot, wherein respective pivot axes of the first and second pivots are substantially parallel to one another and separated by an offset distance, such that the door of the vehicle is opened when the door strut is extended and closed when the door strut is retracted.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION OF EXEMPLARY EMBODIMENTS

The following detailed description refers to the accompanying drawings. Wherever possible, the same reference numbers are used in the drawings and the following description to refer to the same or similar parts. While several exemplary embodiments are described herein, modifications, adaptations, and other implementations are possible. For example, substitutions, additions, or modifications may be made to the components illustrated in the drawings. Accordingly, the following detailed description is not limited to the disclosed exemplary embodiments.

Figure 1:
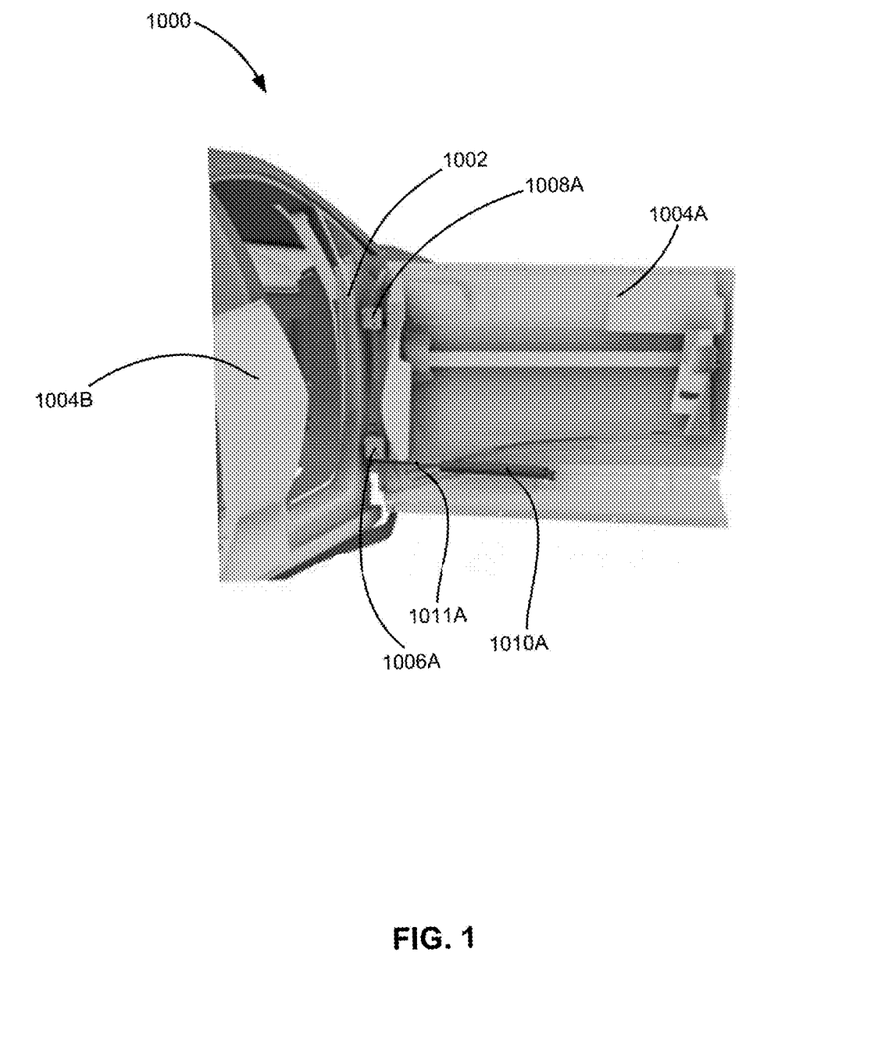
FIG. 1 is a partial perspective view of an exemplary embodiment of a vehicle.

FIG. 1 is a partial perspective view of an exemplary embodiment of a vehicle 1000. FIG. 1 shows, among other things, a vehicle body 1002, a front door 1004A, a front door upper hinge 1008A, a front door lower hinge 1006A, a front door actuator 1010A, and a rear door 1004B. Although FIG. 1 shows only the right side of vehicle 1000, vehicle 1000 may further include additional doors on the left side of vehicle 1000. These additional doors may be similar to front door 1004A and rear door 1004B of the right side of vehicle 1000 described with respect to FIGS. 1-7.

In FIG. 1, upper hinge 1008A and lower hinge 1006A pivotally couple front door 1004A to a vehicle body 1002 of vehicle 1000. Any number of hinges may be used to pivotally couple front door 1004A to vehicle body 1002. In some embodiments, pivoting axes of the hinges pivotally coupling front door 1004A to vehicle body 1002 (e.g., upper hinge 1008A and lower hinge 1006A) may be aligned. Two axes are considered to be aligned when the axes are substantially parallel to one another and substantially co-linear with one another. Such alignment of the pivoting axes may enable pivoting (i.e., opening and closing) of front door 1004A about the aligned pivoting axes of upper hinge 1008A and lower hinge 1006A.

Still referring to FIG. 1, according to some embodiments, a first end of actuator 1010A may be pivotally coupled to lower hinge 1006A, and a second end of actuator 1010A may be pivotally coupled to front door 1004A. The pivoting axes of the first end and the second end of actuator 1010A may be substantially parallel to the pivoting axes of lower hinge 1006A and upper hinge 1008A. According to some embodiments, the pivoting axis of the first end of actuator 1010A may be separated by an offset distance from the pivoting axes of lower hinge 1006A and upper hinge 1008A. In the exemplary embodiment shown, actuator 1010A includes a door strut 1011A configured to extend and retract. In this exemplary configuration, when door strut 1011A is extended, front door 1004A may be partially or fully opened. When door strut 1011A is retracted, front door 1004A may be partially or fully closed.

According to some embodiments, vehicle 1000 may include an additional actuator, for example, whose first end is pivotally coupled to top hinge 1008A and whose second end is pivotally coupled to front door 1010A in a similar manner as actuator 1010A.

According to some embodiments, door strut 1011A may be extended and/or retracted in response to an electrical signal. For example, the electrical signal may be generated by a processor. According to some embodiments, the electrical signal may be generated by a processor based on signals from a sensor. The sensor may include, for example, a proximity sensor, an inertial sensor, and/or a radio-frequency sensor (e.g., for receiving signal from a remote dongle).

Figure 3:
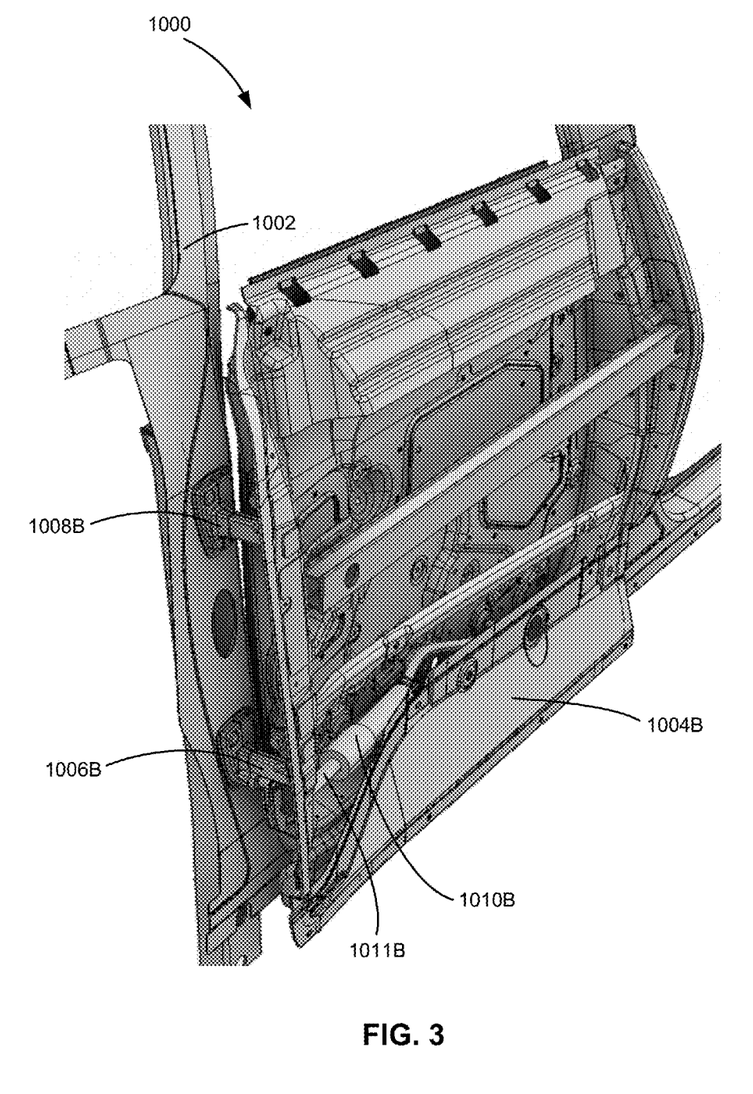
FIG. 3 is a partial perspective view of the exemplary vehicle of FIG. 1, including an exemplary embodiment of a rear door shown from outside the vehicle with an exterior panel of the rear door being omitted for clarity.

FIG. 1 shows hinges that are associated with front door 1004A. According to some embodiments, vehicle 1000 may include a rear door 1004B pivotally coupled to vehicle body 1002 in a manner similar to front door 1004A. For example, as shown in FIG. 3, rear door 1004B may be pivotally coupled to vehicle body 1002 by a rear door upper hinge 1008B and a rear door lower hinge 1006B that may be similar to front door upper hinge 1008A and front door lower hinge 1006A associated with front door 1004A, respectively. Rear door actuator 1010B may be pivotally coupled to rear door lower hinge 1006B and to rear door 1004B. Alternatively, rear door 1004B may be pivotally coupled to vehicle body 1002 by a number of hinges different from the number of hinges pivotally coupling front door 1004A to vehicle body 1002.

Figure 2:
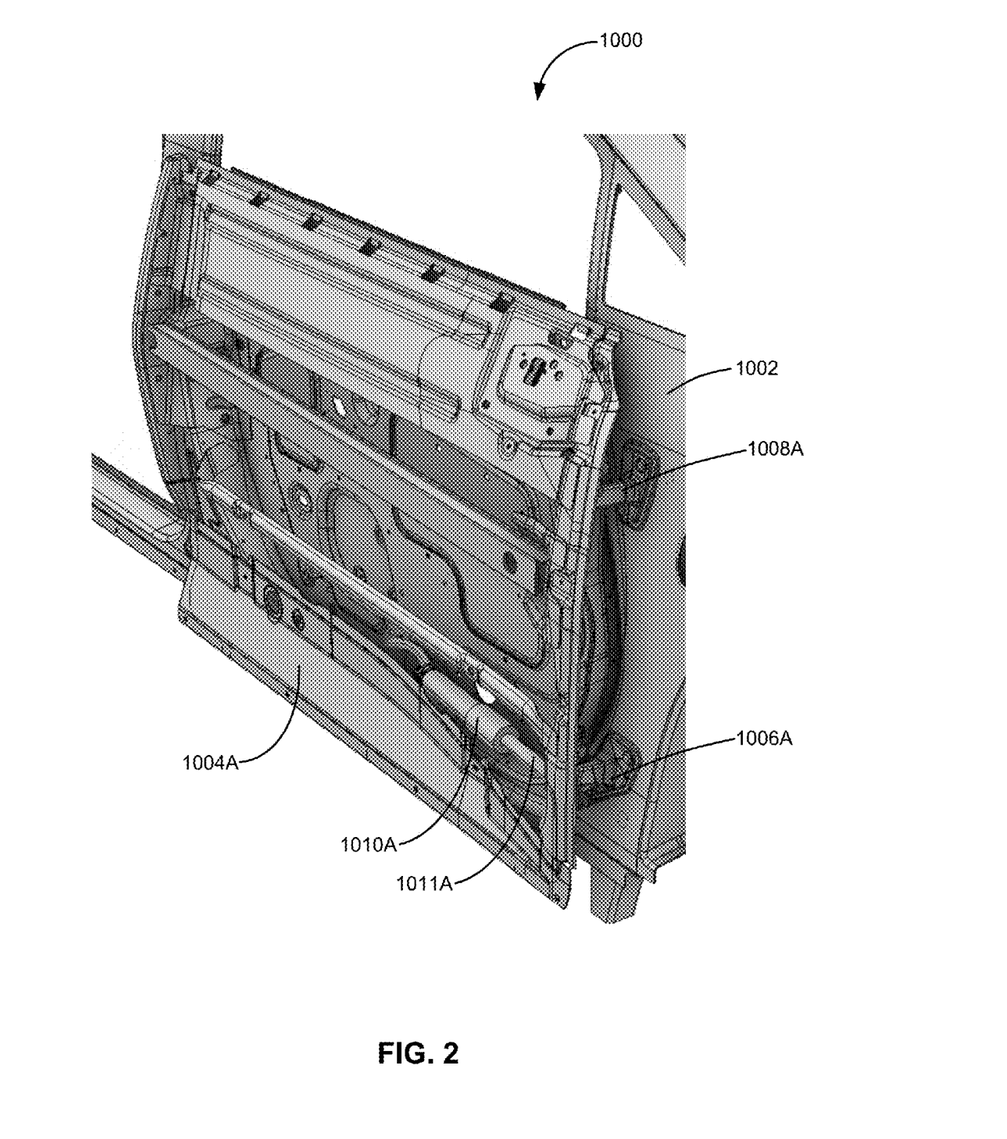
FIG. 2 is a partial perspective view of the exemplary vehicle of FIG. 1, including an exemplary embodiment of a front door shown from outside the vehicle with an exterior panel of the front door being omitted for clarity.

FIG. 2 is a partial perspective view of the exemplary vehicle of FIG. 1, including an exemplary embodiment of a front door shown from outside the vehicle with an exterior panel of the front door being omitted for clarity. As discussed above, front door upper hinge 1008A and front door lower hinge 1006A may pivotally couple front door 1004A to vehicle body 1002. A first end of actuator 1010A may be pivotally coupled to bottom hinge 1006A and a second end of actuator 1010A may be pivotally coupled to front door 1004A. FIG. 2 further shows that actuator 1010A may be at least partially housed inside front door 1004A, for example, such that it is not visible when front door 1004A is in an assembled state. According to the exemplary embodiment shown in FIG. 2, the second end of actuator 1010A may be pivotally coupled to an intermediate region of front door 1004A. In some embodiments, the second end of actuator 1010A may be pivotally coupled to any region of front door 1004A as long as the pivoting axis is substantially parallel to the pivoting axes of front door hinges 1008A and 1006A. The location at which the second end of actuator 1010A is pivotally coupled to front door 1004A may affect the magnitude of torque applied to front door 1004A (when actuator 1010A is actuated) and/or the magnitude of force applied by door strut 1011A. The location at which the second end of actuator 1010A is pivotally coupled to front door 1004A may be based on various parameters, such as, but not limited to, actuating strength of actuator 1010A, length of actuator 1010A, weight of front door 1004A, and/or desired speed of the opening and closing motion of front door 1004A.

FIG. 3 is a partial perspective view of the exemplary vehicle of FIG. 1, including an exemplary embodiment of a rear door shown from outside the vehicle with an exterior panel of the rear door being omitted for clarity. FIG. 3 shows a rear door upper hinge 1008B, a rear door lower hinge 1006B, and a rear door actuator 1010B, which may be similar to front door upper hinge 1008A, front door lower hinge 1006A, and/or front door actuator 1010A shown in FIG. 2, respectively.

Figure 4:
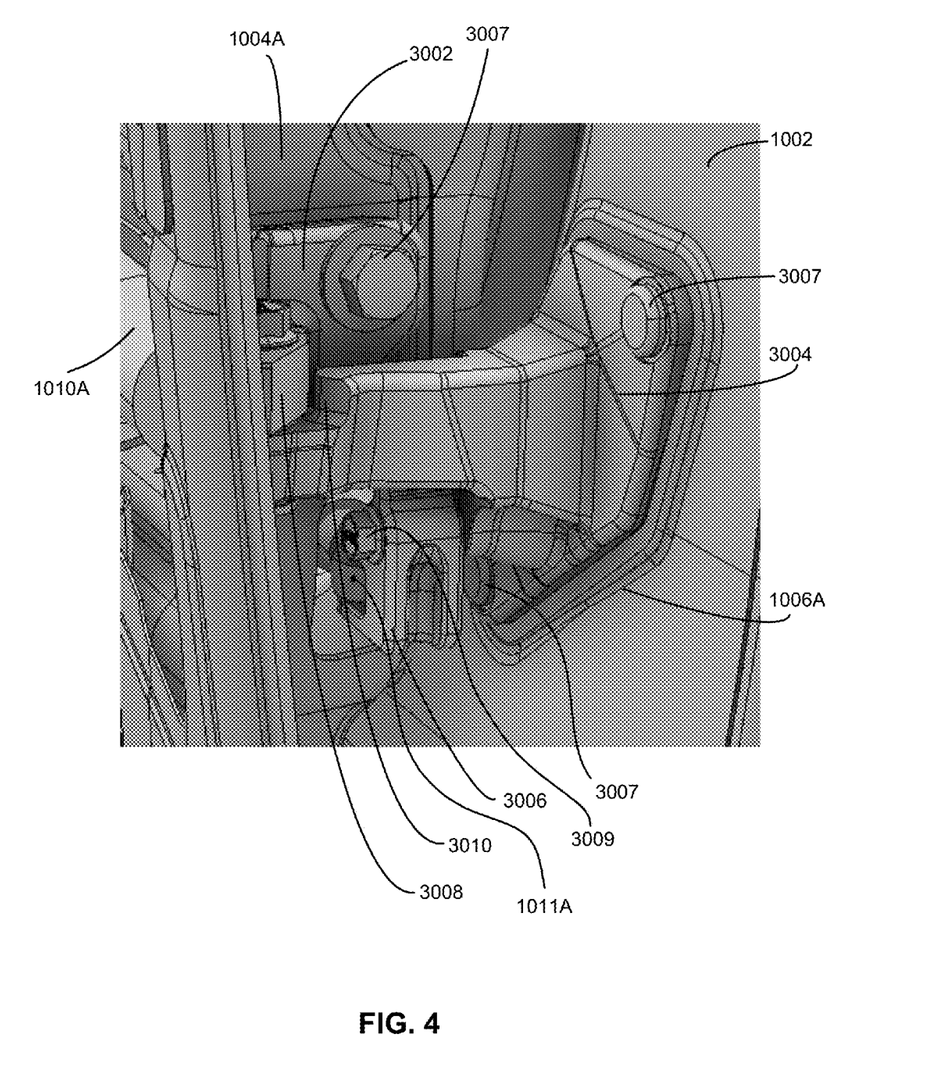
FIG. 4 is a partial perspective view of the exemplary vehicle of FIG. 1, including an exemplary embodiment of a front door lower hinge.
Figure 5:
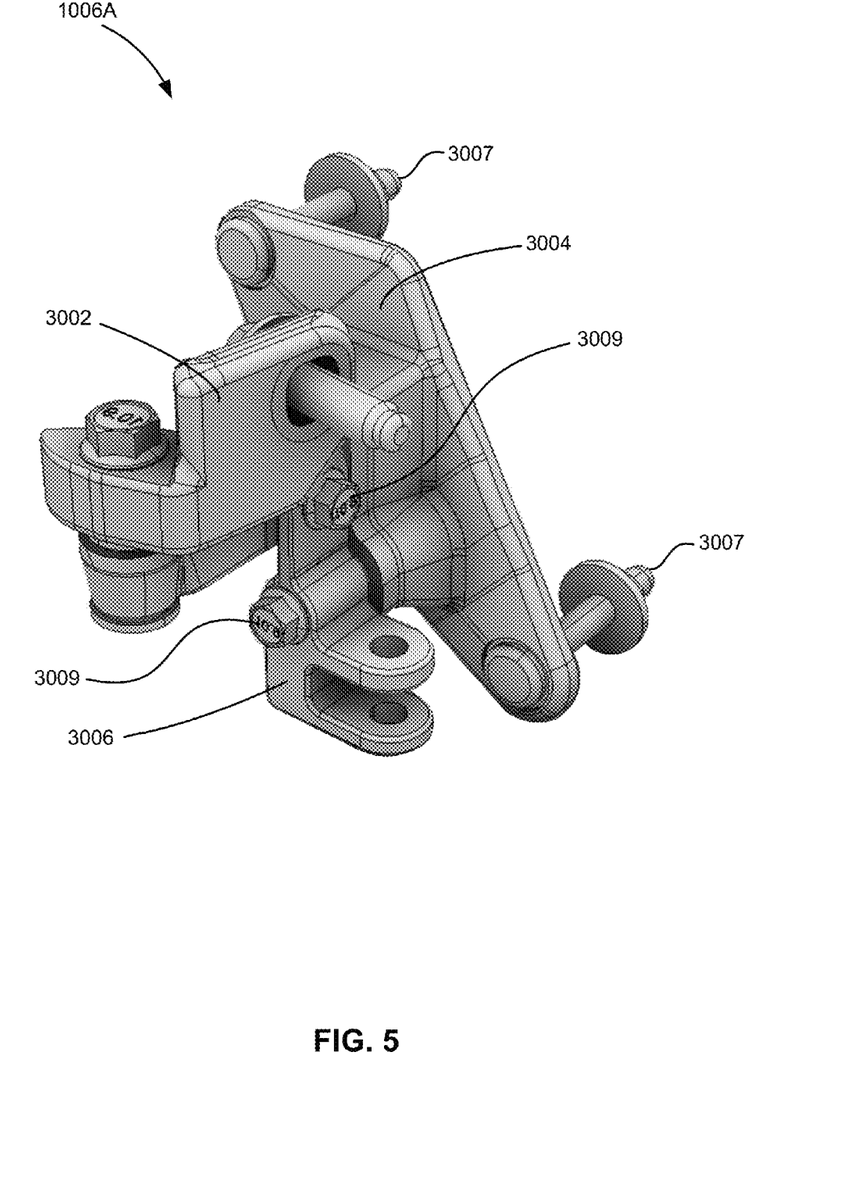
FIG. 5 is a perspective view of the exemplary front door lower hinge shown in FIG. 4.

FIG. 4 is a partial perspective view of exemplary vehicle 1000 of FIG. 1, including an exemplary embodiment of a front door lower hinge 1006A. FIG. 5 is a perspective view of exemplary lower hinge 1006A shown in FIG. 4. As shown in FIGS. 4 and 5, exemplary front door lower hinge 1006A may include a door strap 3002 coupled to front door 1004A, a body strap 3004 coupled to vehicle body 1002, and a strut strap 3006 pivotally coupled to actuator 1010A. For example, door strap 3002 and body strap 3004 may be coupled to front door 1004A and vehicle body 1002, respectively, for example, via one or more bolts 3007, as shown in FIGS. 4 and 5. According to some embodiments, door strap 3002 and/or body strap 3004 may be welded to front door 1004A and/or vehicle body 1002, respectively. As shown in FIG. 4, body strap 3004 may be wider towards vehicle body 2002.

As shown in FIGS. 4 and 5, exemplary door strap 3002 may be pivotally coupled to body strap 3004, such that the associated pivoting axis is substantially perpendicular to a longitudinal axis of vehicle 1000. According to such embodiments, exemplary front door 1004A shown in FIGS. 4 and 5 may open and/or close by pivoting outward and inward relative to the side of vehicle 1000. In some embodiments, door strap 3002 may be pivotally coupled to body strap 3004, such that the pivoting axis is substantially parallel to a longitudinal axis of vehicle 1000. In such embodiments, front door 1004A may open or close by pivoting upward and downward relative to the side of vehicle 1000.

As shown in FIGS. 4 and 5, exemplary strut strap 3006 may be pivotally coupled to one end of actuator 1010A, such that the pivoting axis defined by strut strap 3006 and door strut 1010A is substantially parallel to the pivoting axis defined by body strap 3004 and door strap 3002. According to the exemplary embodiment shown, the pivoting axis between strut strap 3006 and door strut 1010A may be separated from the pivoting axis between body strap 3004 and door strap 3002 by an offset distance. The presence of the offset distance may provide a moment arm to facilitate opening and closing of front door 1004A by extending and retracting, respectively, door strut 1011A of actuator 1010A. For example, the presence of the offset distance enables front door 1004A to be pivoted about the pivoting axis between strut strap 3006 and actuator 1010A when door strut 1011A is extended or retracted. In some embodiments, the presence of the offset distance may enable damping of the motion of front door 1004A. The length of the offset distance may correlate to the magnitude of the torque applied to front door 1004A when actuator 1010A is actuated and/or to the magnitude of the force applied by actuator 1010A when actuator 1010A is actuated). For example, a longer offset distance may be used in embodiments where a less powerful actuator 1010A is used, while a smaller offset distance may be used in embodiments where a more powerful actuator 1010A is used.

As shown in FIG. 5, exemplary strut strap 3006 may be coupled to body strap 3004 via one or more bolts 3009. As shown in FIG. 5, bolts 3009 may be oriented, such that each bolt 3009 aligns with an axis orthogonal to the pivoting axis defined by strut strap 3006 and actuator 1010A. Such orientation of bolts 3009 may reduce or minimize undesirable movement of door strap 3002 with respect to body strap 3004 during opening and closing of front door 1004A. In some embodiments, strut strap 3006 may be welded to body strap 3004. In some embodiments, body strap 3004 and strut strap 3006 may be formed as a unitary integrated part. For example, body strap 3004 and strut strap 3006 may be formed as a single forged or cast piece (e.g., forged steel or cast aluminum).

In some embodiments, door strap 3002 and body strap 3004 may each be shaped such that, when door strap 3002 and body strap 3004 are pivotally coupled to one another, the range of pivoting motion is limited to a predetermined angle. For example, as shown in FIG. 4, door strap 3002 and body strap 3004 may include motion limiting stops 3008 and 3010, respectively. In the example of FIG. 4, motion limiting stops 3008 and 3010 may be configured to limit the maximum inner angle between door strap 3002 and body strap 3004 to a predetermined angle, thereby limiting the inner angle between front door 1004A and vehicle body 1002 to the same angle. In some embodiments, the predetermined angle may be selected such that when the inner angle between front door 1004A and vehicle body 1002 is at the maximum, predetermined angle, actuator 1010A is not completely extended. Selecting the predetermined angle in such a way may protect actuator 1010A from over extension, thereby preventing potential damage to actuator 1010A. In some embodiments, the pivoting motion between door strap 3002 and body strap 3004 may not be limited by motion limiting stops 3008 and/or 3010. For example, motion limiting stops 3008 and/or 3010 may not be provided on door strap 3002 and/or body strap 3004, respectively. In such embodiments, the maximum angle between front door 1004A and vehicle body 1002 may be limited by the range of motion of door strut 1011A of actuator 1010A.

Figure 6:
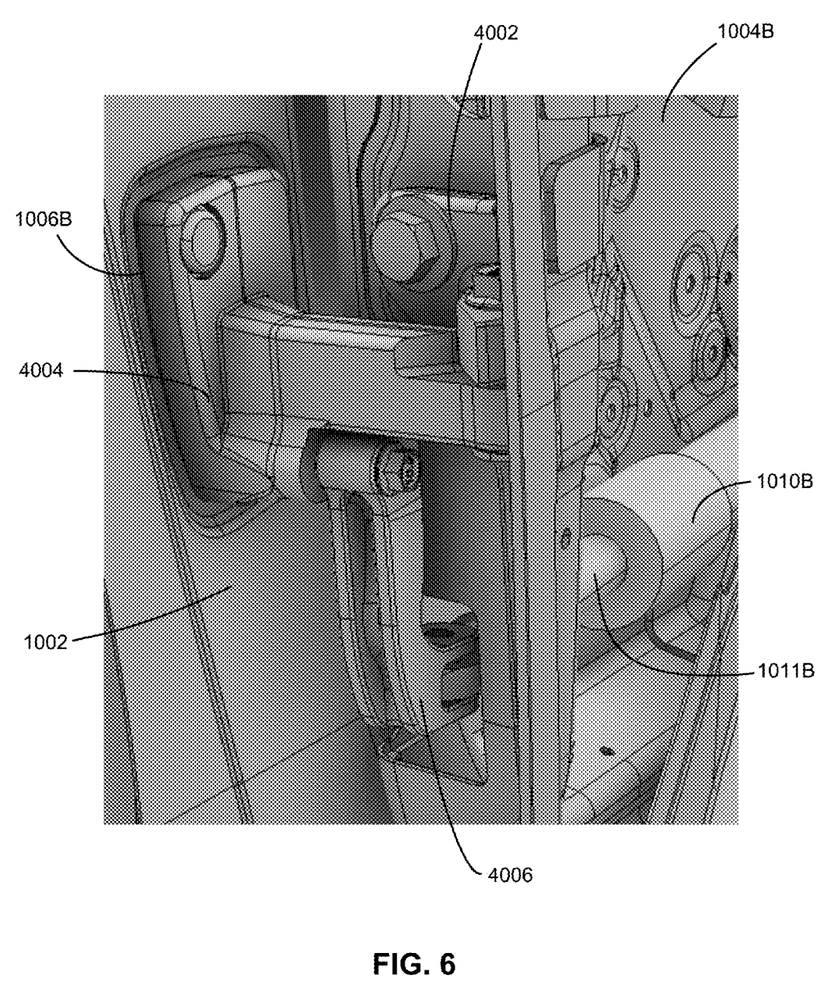
FIG. 6 is a partial perspective view of the exemplary vehicle of FIG. 1, including an exemplary embodiment of a rear door lower hinge.
Figure 7:
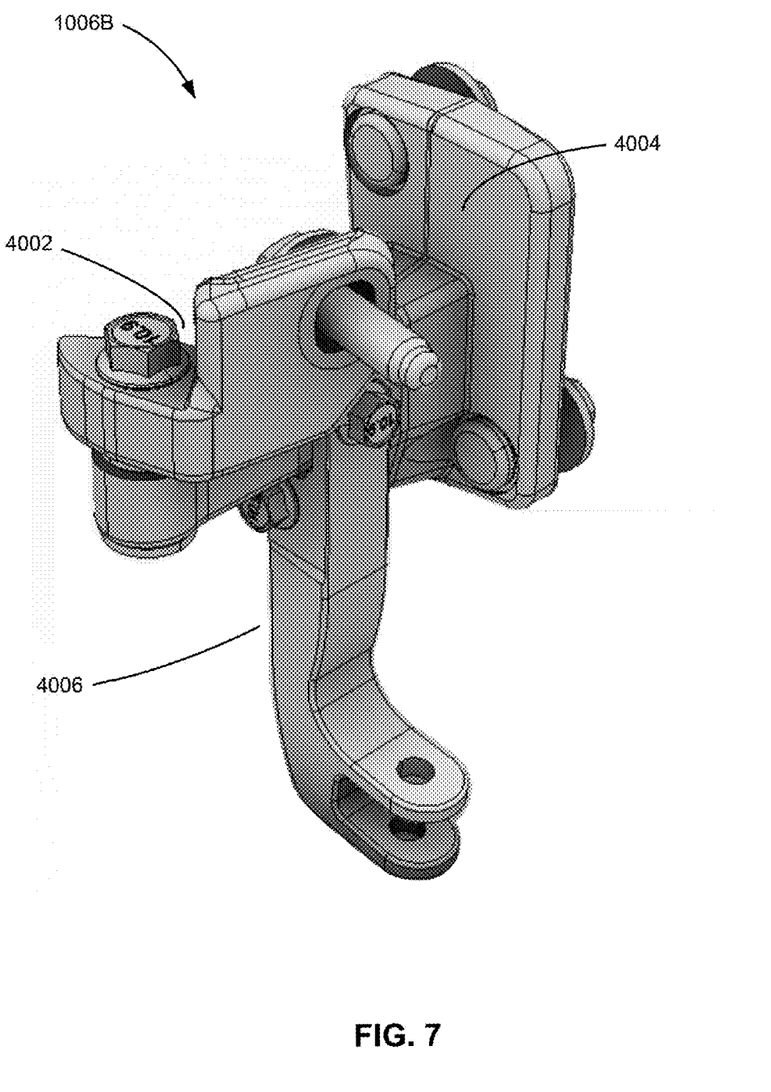
FIG. 7 is a perspective view of the exemplary rear door lower hinge shown in FIG. 6.

FIG. 6 is a partial perspective view of exemplary vehicle 1000 of FIG. 1, including an exemplary embodiment of rear door lower hinge 1006B. FIG. 7 is a perspective view of exemplary rear door lower hinge 1006B shown in FIG. 6.

As shown in FIGS. 6 and 7, exemplary rear door lower hinge 1006B may be similar to front door lower hinge 1006A shown in FIGS. 4 and 5, except that the shapes of strap strut 4006 and body strap 4004 of rear door lower hinge 1006B are different with respect to the shapes of strap strut 3006 and body strap 3004 of front door lower hinge 1006A. According to the exemplary embodiment shown in FIGS. 6 and 7, strap strut 4006 may be longer than strap strut 3006 because, for example, actuator 1010B may be positioned lower on rear door 1004B than actuator 1010A on front door 1004A. The shape of body strap 4004 may be different, for example, because of the shape of the portion of vehicle body 1002 to which body strap 4004 is attached may be different than the shape of the portion of vehicle body 1002 to which body strap 3004 is attached.

According to some embodiments, deformation of vehicle body 1002 during opening and closing of the vehicle doors may be reduced or eliminated by pivotally coupling one end of actuator 1010A and/or actuator 1010B to a door hinge instead of vehicle body 1002; and the other end of actuator 1010A and/or 1010B to the front and/or rear doors. In such embodiments, deformation of vehicle body 1002 may be reduced or eliminated because lower hinges 1006A and/or 1006B may be formed from a more rigid material than vehicle body 1002 and/or because the hinges may have a structural design that is relatively more rigid. For example, the hinges may be thicker in cross-section than vehicle body 1002. In addition to reducing the deformation of vehicle body 1002, some embodiments may enable the use of relatively heavier doors that may have caused the vehicle body to deform undesirably when a conventional configuration is used.

According to some embodiments, pivotally coupling one end of actuators 1010A and/or 1010B to a door hinge instead of vehicle body 1002 may provide additional benefits. For example, in accordance with at least some embodiments disclosed herein, the door may be attached and/or detached from vehicle body 1002 by attaching or detaching the hinge(s). Such capability may reduce manufacturing cost. For example, the reduction in the step(s) and/or time to completely attach or detach a door from vehicle body 1002 may reduce, for example, the cost associated with painting the vehicle when the doors are painted separately from the vehicle body 1002.

While exemplary embodiments have been described herein, the recitations in the claims are to be interpreted broadly based on the language employed in the claims and not limited to examples described in the present specification or during the prosecution of the application. The examples are to be construed as non-exclusive. It is intended, therefore, that the specification and examples be considered as illustrative only, with a true scope and spirit being indicated by the following claims and their full scope of equivalents.

What is claimed is:

1. A vehicle door hinge system, comprising:
an actuator configured to pivot a vehicle door, the actuator comprising a door strut; and
a door hinge comprising:
a body strap having a body end and a pivot end, the body end of the body strap being configured to be coupled to a body of a vehicle;
a door strap having a door end and a pivot end, the door end of the door strap being configured to be coupled to a door of the vehicle, wherein the pivot end of the door strap and the pivot end of the body strap are pivotally coupled to one another to form a first pivot; and
a strut strap having a strap end and a strut end, the strap end being attached to the body strap between the body end and the pivot end of the body strap, the strut end of the strut strap and the door strut being pivotally coupled to one another to form a second pivot,
wherein respective pivot axes of the first and second pivots are parallel to one another and separated by an offset distance, such that the door of the vehicle is opened when the door strut is extended and closed when the door strut is retracted.

2. The vehicle door hinge system of claim 1, wherein the door strut comprises an electrically actuated strut.

3. The vehicle door hinge system of claim 1, wherein the door strut is configured to be controlled via a processor.

4. The vehicle door hinge system of claim 1, wherein the door strut is configured to be controlled via a processor based on signals from a sensor.

5. The vehicle door hinge system of claim 1, wherein the door strap is configured to be detached from the body strap at the first pivot.

6. The vehicle door hinge system of claim 1, wherein the pivot axes of the first and second pivots are configured to be transverse to a longitudinal axis of the vehicle.

7. The vehicle door hinge system of claim 1, wherein the pivot axes of the first and second pivots are configured to be substantially parallel to a longitudinal axis of the vehicle.

8. The vehicle door hinge system of claim 1, wherein at least one of the body strap, the strut strap, and the door strap is formed from at least one of steel and aluminum.

9. A vehicle comprising:
a vehicle body;
a door coupled to the vehicle body;
an actuator configured to assist with opening and closing the door and comprising a door strut having a first end and a second end; and
a door hinge coupling the door to the vehicle body and comprising:
a body strap having a body end and a pivot end, the body end of the body strap being coupled to the vehicle body;
a door strap having a door end and a pivot end, the door end of the door strap being coupled to the door, wherein the pivot end of the door strap and the pivot end of the body strap are pivotally coupled to one another to form a first pivot; and
a strut strap having a strap end and a strut end, the strap end being coupled to the body strap between the body end and the pivot end of the body strap, the strut end of the strut strap and the first end of the door strut being pivotally coupled to one another to form a second pivot, wherein respective pivot axes of the first and second pivots are parallel to one another and separated by an offset distance, such that the door of the vehicle is opened when the door strut is extended and closed when the door strut is retracted.

10. The vehicle of claim 9, wherein the door strut comprises an electrically actuated strut.

11. The vehicle of claim 9, wherein the door strut is configured to be controlled via a processor.

12. The vehicle of claim 9, wherein the door strut is configured to be controlled via a processor based on signals from a sensor.

13. The vehicle of claim 9, wherein the door strap is configured to be detached from the body strap at the first pivot.

14. The vehicle of claim 9, wherein the pivot axes of the first and second pivots are transverse to a longitudinal axis of the vehicle.

15. The vehicle of claim 9, wherein the pivot axes of the first and second pivots are substantially parallel to a longitudinal axis of the vehicle.

16. The vehicle of claim 9, wherein at least one of the body strap, the strut strap, and the door strap is formed from at least one of steel and aluminum.

17. A vehicle door hinge system, comprising:
an actuator configured to pivot a vehicle door, the actuator comprising the door strut; and
a door hinge comprising:
a body strap having a body end, a pivot end, and a strut end, the body end of the body strap being configured to be coupled to a body of a vehicle and the strut end of the body strap and a door strut being pivotally coupled to one another to form a first pivot; and
a door strap having a door end and a pivot end, the door end of the door strap being configured to be coupled to a door of the vehicle, wherein the pivot end of the door strap and the pivot end of the body strap are pivotally coupled to one another to form a second pivot,
wherein respective pivot axes of the first and second pivots are substantially parallel to one another and separated by an offset distance, such that the door of the vehicle is opened when the door strut is extended and closed when the door strut is retracted.

18. The vehicle door hinge system of claim 17, wherein the pivot axes of the first and second pivots are configured to be transverse to a longitudinal axis of the vehicle.

19. The vehicle door hinge system of claim 17, wherein the pivot axes of the first and second pivots are configured to be substantially parallel to a longitudinal axis of the vehicle.

20. The vehicle door hinge system of claim 17, wherein at least one of the body strap and the door strap is formed from at least one of steel and aluminum.

* * * * *